Feb. 11, 1941.     J. E. WINCHESTER     2,231,238
WIRE CLAMP
Filed May 18, 1939

INVENTOR.
JOHN E. WINCHESTER
BY  Horace B. Fay
ATTORNEY.

UNITED STATES PATENT OFFICE 2,231,238

WIRE CLAMP

John E. Winchester, Cleveland Heights, Ohio, assignor to The National Telephone Supply Company, Cleveland, Ohio, a corporation of Ohio Application May 18, 1939, Serial No. 274,418

4 Claims. (Cl. 24—125)

This invention relates, as indicated, to wire clamps, but has reference more particularly to devices of this character having improved wire gripping or holding properties.

The primary object of the invention is to provide devices of the character described which are adapted to grip the wires clamped or carried thereby more securely and positively than similar devices heretofore in use.

Other objects and features of the invention will appear hereafter.

Figure 1:
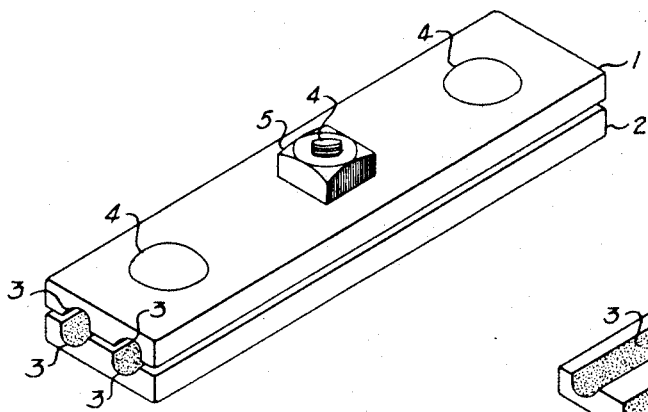
Fig. 1 is a perspective view of a guy clamp embodying my invention.
Figure 2:
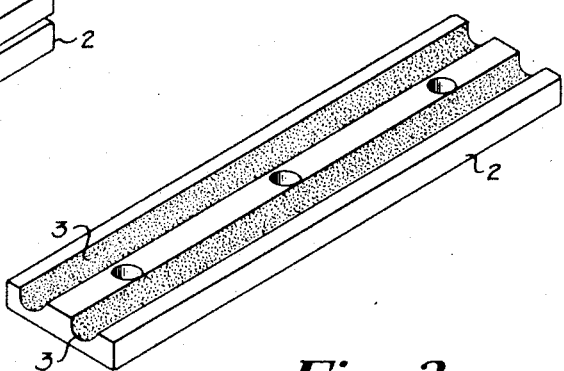
Fig. 2 is a perspective of one of the members of the guy clamp.

Referring more particularly to Figs. 1 and 2, the guy clamp is seen to comprise substantially rectangular complementary wire clamping members 1 and 2, each having a pair of transversely spaced longitudinally extending grooves or recesses 3 of semi-circular form, the grooves of one member being disposed oppositely to those of the other member to thereby provide substantially circular wire-receiving passages through the clamp, when the clamping members are secured together, as by means of bolts 4 and nuts 5, as clearly shown in Fig. 1.

In order to enhance the wire gripping properties of the clamp, the walls of the grooves or recesses 3 have applied thereto a material, such for example as nichrome, or other hard metals, as well as non-metallic materials, such as carborundum, emery, etc. This material is so applied to the walls of the grooves or recesses, as to appear in the form of discrete particles, each having the ability to penetrate and positively grip the peripheral surface of the wire when the members 1 and 2 of the clamp are drawn together to clamp the wire which extends through the circular passage formed by such members. In this way, the wire is clamped much more securely and positively than has been possible by the use of the conventional guy clamps.

The wire-gripping material is preferably permanently applied to the wall of the grooves by spraying the material in molten form thereon, thereby causing said material to become fused to said wall. This method is particularly desirable where the material is metal. Other methods of applying the material may be employed, as for example, securing the material to the walls of the grooves by means of an adhesive, pressing the material mechanically into the walls of the grooves, etc.

Figure 3:
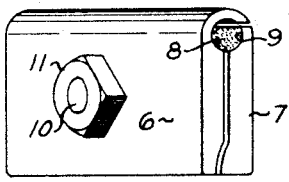
Fig. 3 is a perspective view of a cable suspension clamp embodying my invention.
Figure 4:
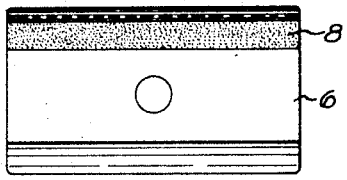
Fig. 4 is a plan view of one of the members of the cable suspension clamp.

Referring to Figs. 3 and 4, the cable-suspension clamp is seen to comprise complementary members 6 and 7 of generally rectangular form, the member having adjacent one edge thereof a longitudinally extending semi-circular groove 8, which forms, with a similarly disposed groove or recess 9 in the member 7, a circular passage through the clamp for the reception of the cable to be gripped or held by the clamp. The members are adapted to be secured together in cable clamping relation, as by means of a bolt 10 and nut 11.

The walls of the recesses 8 and 9 are coated with wire gripping material in the same manner as the recesses 3 of the guy clamp.

Figure 5:
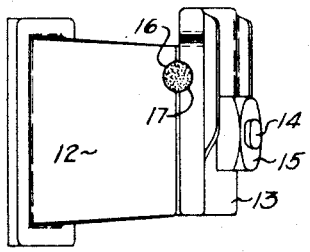
Fig. 5 is a perspective view of a messenger wire hanger embodying my invention.
Figure 6:
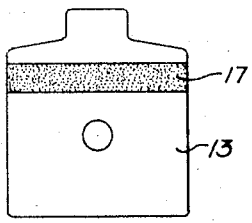
Fig. 6 is a plan view of one of the members of the messenger.

Referring to Figs. 5 and 6, the messenger hanger is seen to comprise complementary members 12 and 13, the member 12 adapted to be secured to a pole, and the member 13 adapted to be secured to the member 12, as by means of a bolt 14 and nut 15. The member 12 is provided in its front face, adjacent its upper edge with a semi-circular groove or recess 16, which extends entirely across such member, and forms with a similarly disposed groove or recess 17 in the member 13 a circular passage through the hanger for the reception of the messenger wire (not shown) to be gripped or held by the hanger.

The walls of the recesses 16 and 17 are coated with a wire gripping material in the same manner as the recesses in the guy and cable suspension clamps.

It will be understood that the invention is not limited in its application or scope to the specific devices which have been described, but may be used in connection with similar devices, such as guy clips, universal suspension hangers, etc.

Figure 7:
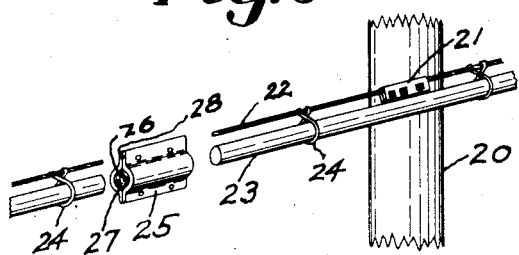
Fig. 7 is a perspective view showing a grade clamp embodying the invention.

A particularly desirable application of the invention is in connection with grade clamps. This is clearly illustrated in Fig. 7, in which a pole 20 located on a downgrade or upgrade has secured thereto, as by means of a cable suspension clamp 21, a messenger wire 22, from which a cable 23 is suspended as by means of clips 24. In order to minimize movement of the cable 23, due to its own weight on the downgrade or upgrade, grade clamps 25 are employed, which are secured to the messenger wire and to the cable, as shown. The inner surfaces 26 and 27, as well as the walls of the opening 28, through which the messenger wire 22 extends, are coated with the wire-gripping material, which has been described.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:

1. A device of the character described comprising complementary metal members adapted to be moved relatively to each other to clamp a wire therebetween, the said members having opposed recesses therein to receive a portion of said wire, the walls of said recesses having a wire gripping material in the form of discrete metallic particles that are harder than the metal of the complementary members secured thereto and integrally united therewith, and means for securing said members together.

2. A device of the character described comprising complementary metal members adapted to be moved relatively to each other to clamp a wire therebetween, at least one of said members having a recess therein for receiving a wire, the wall of said recess having a wire gripping material in the form of discrete metallic particles that are harder than the metal of the complementary members secured thereto and integrally united therewith, and means for securing said members together.

3. A device of the character described comprising complementary metal members adapted to be moved relatively to each other to clamp a wire therebetween, the said members having opposed recesses therein to receive a portion of said wire, the wall of said recesses having a wire gripping material in the form of discrete particles of nichrome that are harder than the metal of the complementary members secured thereto and integrally united therewith, and means for securing said members together.

4. A device of the character described comprising complementary metal members adapted to be moved relatively to each other to clamp a wire therebetween, the said members having opposed recesses therein to receive a portion of said wire, the wall of said recesses having a wire gripping material in the form of discrete metallic particles that are harder than the metal of the complementary members secured thereto and integrally united therewith, the joint between the wire gripping material and complementary members constituting a fused bond, and means for securing said members together.

JOHN E. WINCHESTER.